(12) United States Patent
Geagan et al.

(10) Patent No.: US 10,467,384 B2
(45) Date of Patent: Nov. 5, 2019

(54) SUBSET-DIFFERENCE BROADCAST ENCRYPTION WITH BLACKLISTING

(71) Applicant: INTERNATIONAL BUSINESS MACHINES CORPORATION, Armonk, NY (US)

(72) Inventors: John B. Geagan, San Jose, CA (US); Dulce B. Ponceleon, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 246 days.

(21) Appl. No.: 15/158,296

(22) Filed: May 18, 2016

(65) Prior Publication Data

US 2017/0337351 A1    Nov. 23, 2017

(51) Int. Cl.
*H04L 9/08* (2006.01)
*G06F 21/10* (2013.01)

(52) U.S. Cl.
CPC ............ *G06F 21/10* (2013.01); *H04L 9/0836* (2013.01); *H04L 9/0891* (2013.01); *H04L 2209/601* (2013.01)

(58) Field of Classification Search
None
See application file for complete search history.

(56) References Cited

U.S. PATENT DOCUMENTS

| 8,090,105 B2 | 1/2012 | Lotspiech |
| 9,894,066 B2 * | 2/2018 | Conrad ............. H04W 12/0023 |
| 2003/0105956 A1 * | 6/2003 | Ishiguro .................. G06F 21/10 |
| | | 713/158 |
| 2004/0114762 A1 | 6/2004 | Medvinsky |

(Continued)

FOREIGN PATENT DOCUMENTS

| JP | 2008092514 A | 4/2008 |
| WO | 2009074941 A1 | 6/2009 |

OTHER PUBLICATIONS

Hongxia, J. et al. (2009) Defending against the pirate evolution attack.

(Continued)

*Primary Examiner* — Trang T Doan
(74) *Attorney, Agent, or Firm* — Erik Huestis; Stephen Kenny; Foley Hoag

(57) ABSTRACT

An encryption scheme is provided in which subset-difference lists are generated by blacklisting subsets corresponding to compromised devices and splitting subset difference lists corresponding to the blacklisted subsets into multiple subset difference lists. In some embodiments, a subset-difference tree is generated. The subset-difference tree includes a plurality of subsets. The subset-difference tree covers a plurality of nodes. Each of the plurality of subsets has an apex node among the plurality of nodes. At least one blacklisted node of the plurality of nodes is determined. A first subset among the plurality of subsets is identified that covers the at least one blacklisted node. A plurality of (Continued)

substitute subsets is determined. Each of the plurality of substitute subsets overlaps the first subset and does not cover the at least one blacklisted node. The plurality of substitute subsets are substituted for the first subset.

15 Claims, 10 Drawing Sheets

(56) References Cited

U.S. PATENT DOCUMENTS

| | | | |
|---|---|---|---|
| 2005/0257260 A1* | 11/2005 | Lenoir | G11B 20/00086 |
| | | | 726/21 |
| 2006/0129805 A1 | 6/2006 | Kim et al. | |
| 2007/0079118 A1* | 4/2007 | Chmora | H04L 9/0822 |
| | | | 713/163 |
| 2007/0140480 A1* | 6/2007 | Yao | H04L 9/0822 |
| | | | 380/30 |
| 2009/0304185 A1* | 12/2009 | Ju | H04L 9/0836 |
| | | | 380/277 |
| 2012/0128152 A1* | 5/2012 | Rutkowski | H04L 9/0836 |
| | | | 380/44 |
| 2014/0068260 A1* | 3/2014 | Oney | H04L 63/045 |
| | | | 713/168 |
| 2016/0036788 A1* | 2/2016 | Conrad | G07C 9/00571 |
| | | | 713/168 |

OTHER PUBLICATIONS

Kiayias, A. et al. (2007) Pirate evolution: how to make the most of your traitor keys.

Muhanna, A. et al. (Jun. 12, 2010) Binding Revocation for IPv6 Mobility.

McCann, PJ. (May 20, 2010) Distributed Identity Escrow: Toward Scalable Privacy-Preserving Reputation System.

* cited by examiner

SUBSET-DIFFERENCE BROADCAST
ENCRYPTION WITH BLACKLISTING

BACKGROUND

Embodiments of the present invention relate to subset-difference broadcast encryption with blacklisting, and more specifically, to an encryption scheme in which subset-difference lists are generated by blacklisting subsets corresponding to compromised devices and splitting subset difference lists corresponding to the blacklisted subsets into multiple subset difference lists.

BRIEF SUMMARY

According to one embodiment of the present invention, a method of, and computer program product for, blacklisting in a subset-difference broadcast encryption scheme are provided. A subset-difference tree is generated. The subset-difference tree includes a plurality of subsets. The subset-difference tree covers a plurality of nodes. Each of the plurality of subsets has an apex node among the plurality of nodes. At least one blacklisted node of the plurality of nodes is determined. A first subset among the plurality of subsets is identified that covers the at least one blacklisted node. A plurality of substitute subsets is determined. Each of the plurality of substitute subsets overlaps the first subset and does not cover the at least one blacklisted node. The plurality of substitute subsets are substituted for the first subset.

BRIEF DESCRIPTION OF THE SEVERAL
VIEWS OF THE DRAWINGS

DETAILED DESCRIPTION

A subset difference tree approach may be used in a broadcast encryption scheme to restrict authorized access to distributed content. NNL (named for Naor, Naor, and Lotspiech) provides space-efficient key allocations in broadcast encryption systems utilizing a subset difference tree. NNL uses a one-way triple function to traverse downwards through a binary tree and derive encryption keys from parent nodes, where application of the triple function allows determination of a processing key as well as left and right children of the node. In this way, the subtree of a given node is accessible. Content consumers are allocated a unique small set of labels (keys) for specific starting nodes, and by applying the triple function, are able to derive any other labels and keys beneath (covered by) those starting labels. This ability to derive labels from other labels gives NNL its compactness, and in particular allows the distribution of a minimal set of keys to a client. Similarly, NNL enables the distribution of a minimal set of encryptions. Rather than distributing a version of a message encrypted for each target device, messages may be encrypted for subsets of devices using the subset difference tree approach.

The information of the subset-difference coverage tree is used to generate a media key block (MKB) that is provided with media, such as data storage devices, that may be read by the media devices to allow the media devices to access content on the data storage devices. In conventional S-D encryption systems, when a compromised device is detected, the device may be revoked. Since each device holds multiple keys and shares keys with other devices, each of the multiple keys may be revoked. Accordingly, the keys of numerous innocent devices may also be revoked.

In conventional subset-difference (S-D) encryption schemes, individual devices may be revoked by not covering the corresponding nodes in an S-D coverage tree. Embodiments of the present disclosure relate to utilizing a blacklist to allow an encryption system to revoke each key corresponding to a compromised device.

One could enumerate all the possible subset differences for a tree of a given height. After revocation of a given node, future MKB use only those subset differences that do not cover the revoked node. The excluded subset differences may cover additional unrevoked nodes. In some embodiments, the present disclosure allows revocation of the nodes that share the excluded subset difference. A blacklist is created that contains keys that are compromised. Looking at the subset differences used for that compromised key the nodes that share the compromised subset differences are systematically eliminating.

Figure 1:
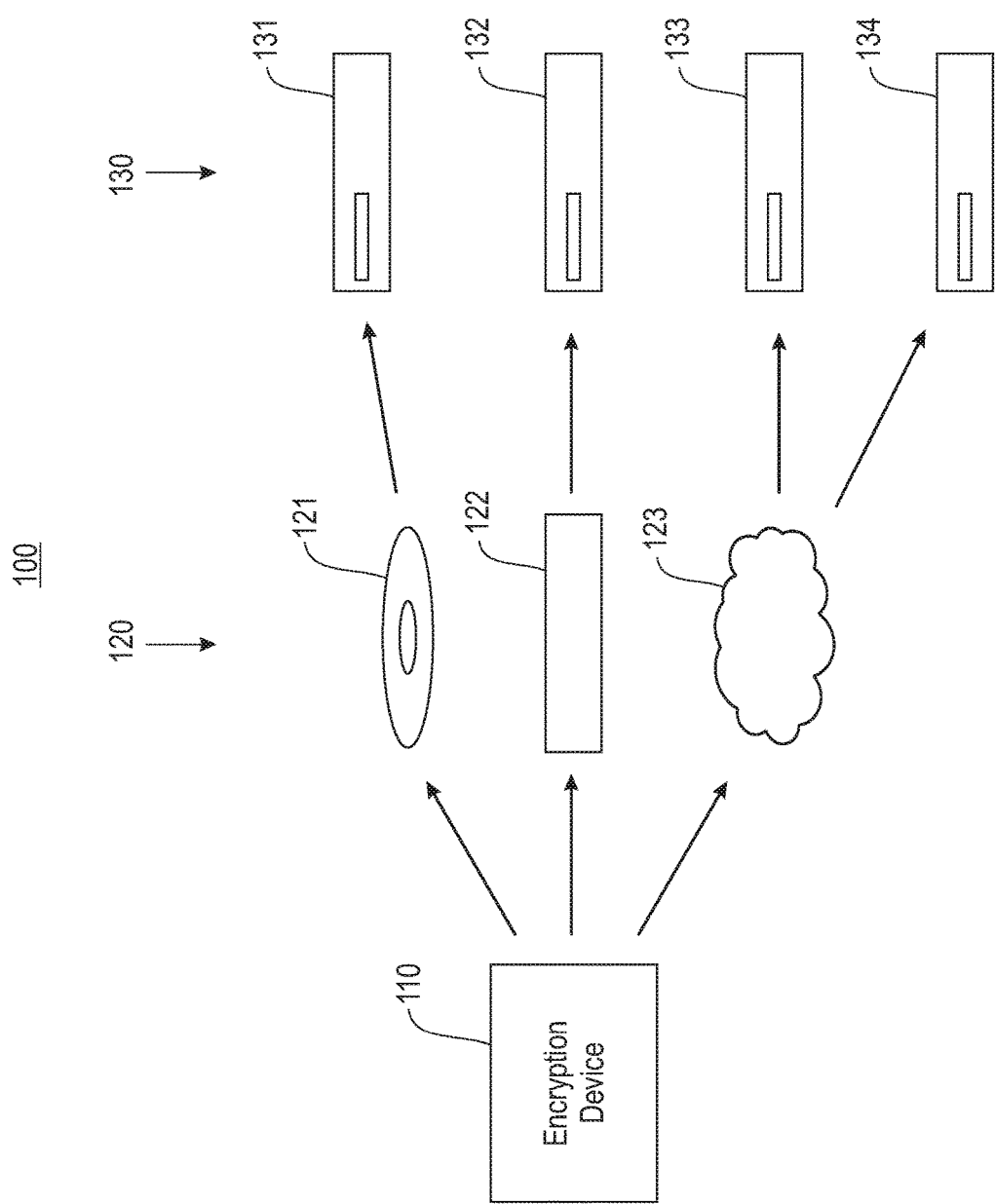
FIG. 1 illustrates an encryption system according to an embodiment of the disclosure.

FIG. 1 is a diagram of an encryption system 100 according to an embodiment of the disclosure. The system 100 includes an encryption device 110, content transmission media 120 and media devices 130 (which may include target devices, such as compromised devices). The encryption device 110 may be one device as illustrated in FIG. 1 or may include multiple devices, each carrying out separate functions of the encryption device 110, described below. In one embodiment, the encryption device 110 is an encryption key block generator, such as a media key block generator. The encryption key block may be decrypted by encryption keys in the media devices 130 to permit the media devices 130 to access content in the content transmission media 120.

FIG. 1 illustrates a few examples of content transmission media 120, although any type of content transmission media 120 may be used. In one embodiment, the content transmission media 120 includes a disk 121, such as an optical disk or a magnetic disk. In one embodiment, the optical disk is a DVD or a Blu-ray disk. The encryption device 110 may store the encryption key block in the disk 121, such as in a header of the disk 121. Upon decrypting the encryption key block, the media device 131 may then decrypt and read the content, or data, on the disk 121.

In another embodiment, the transmission media 120 is a storage device 122, such as a non-volatile memory device. For example, the storage device may include flash memory or any other type of data storage. The storage device 122 may connect to a media device 132, such as a computer running a media program, or conventional media device such as a digital media player, television, DVD player, or any other type of media device.

In another embodiment, the transmission media 120 is a network 123, which may include, for example, wired and wireless transmitters and receivers, servers, and other data storage and transmission devices. The network 123 may transmit encryption key blocks to multiple devices 133 and 134, including dedicated media devices such as televisions, disk players, and digital media storage and playback devices, or the devices 133 and 134 may include general purpose media devices, such as media applications on smartphones, laptops, tablet computers, desktop computers, or any other multi-function device.

While FIG. 1 illustrates only a few media devices 130 for purposes of illustration, embodiments of the present disclosure encompass encryption devices 110 for encrypting data to any number of devices, such as millions, billions, or even trillions of devices. The encryption device 110 may generate the encryption key block by generating a subset-difference (S-D) coverage tree, where each node on the tree corresponds to an encryption key, and generating the encryption key block based on the S-D coverage tree.

Figure 2:
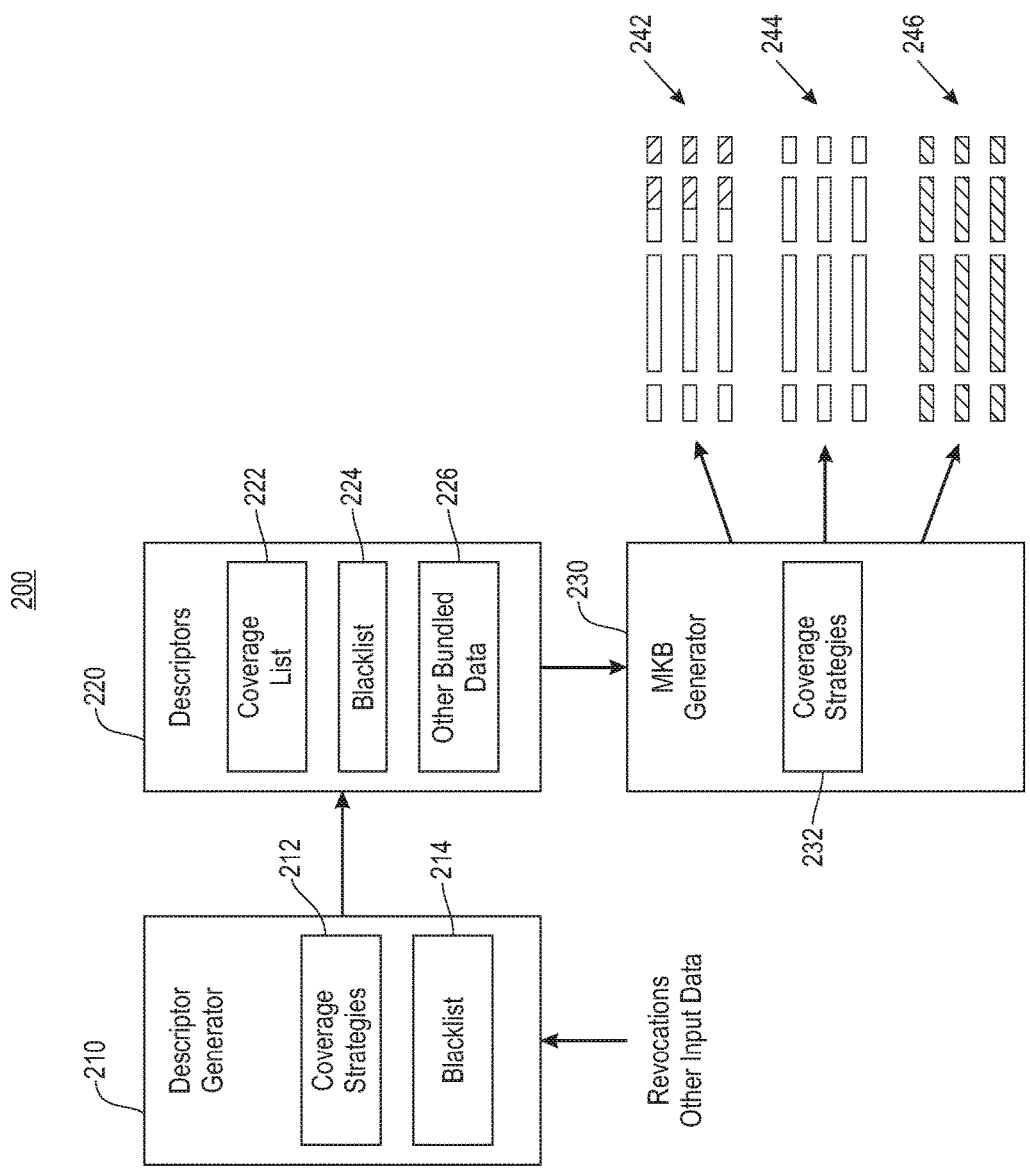
FIG. 2 illustrates an encryption system according to another embodiment of the present disclosure.

FIG. 2 illustrates a block diagram of an encryption system 200 according to one embodiment of the disclosure. The encryption system 200 includes a descriptor generator 210 and an encryption key block generator 230, such as a media key block (MKB) generator 230. For purposes of description, the encryption key block generator 230 will be referred to as an MKB generator 230. However, embodiments of the disclosure encompass any type of encryption key block generator.

The descriptor generator 210 has stored therein one or more coverage strategies 212 and a blacklist 214. The one or more coverage strategies 212 may correspond to different types of media key blocks or other encryption keys. Examples of coverage strategies include NNL type 3, NNL type 4, Matrix SKB and NNL type 10.

The descriptor generator 210 may receive as inputs from one or more users, systems or other devices a list of revocations and other input data. The revocations may correspond to specific subsets, S-Ds, nodes of a coverage tree, matrices or devices. The other input data may include, for example, a list of subset items that are to be added to a blacklist 214. In the present disclosure and claims, the term "subset items" refers to subsets, subset-differences or nodes of a coverage tree. In other words, in some embodiments, coverage of devices may be determined according to subsets (identified by nodes) and in other embodiments the coverage may be determined based on subset-differences (identified by a pair of nodes, including a parent node and a child node). The term "subset items" of a coverage tree encompasses all of these embodiments.

The descriptor generator 210 generates descriptors 220, which may include a coverage list 222 including subset items to be covered, a blacklist 224 including blacklisted coverage items and other bundled data. In embodiments of the disclosure, the descriptors 220 may be compressed data.

The MKB generator 230 includes therein one or more coverage strategies 232. The MKB generator 232 receives the descriptors and generates coverage lists 242, 244 and 246 based on the one or more coverage strategies 232. The coverage lists 242, 244 and 246 may comprise data that correspond to subset items identifying devices to be covered by an encryption scheme and devices to be revoked from the encryption scheme.

In embodiments of the disclosure, the MKB generator 230 may correspond to the encryption device 110 of FIG. 1, and the coverage lists 242, 244 and 246 may be stored in and transmitted via the transmission media 120. In some embodiments, the MKB generator 230 is a secure device or system, having multiple levels of security and being very difficult to reprogram. For example, reprogramming the coverage strategies 232 of the MKB generator may require multiple witnesses, video recording, and other security measures. In contrast, the descriptor generator 210 may have a relatively low level of security, such as not requiring multiple witnesses to modify coverage strategies 212 to generate descriptors 220.

The coverage strategies 212 of the descriptor generator 210 may be configured to generate the descriptors 220 which interact with the coverage strategies of the MKB generator 230 to generate the coverage lists 242, 244 and 246 having varying characteristics. Modifying the coverage strategies 212 of the descriptor generator 210 may result in coverage lists 242, 244 and 246 having correspondingly modified characteristics.

Although FIG. 2 illustrates the descriptor generator 210 as storing the blacklist 214, embodiments of the invention also encompass an MKB generator 230 that has stored therein a blacklist. For example, a list of subset items to be blacklisted may be provided to the MKB generator 230 and the MKB generator 230 may modify coverage lists 242, 244 and 246 accordingly.

Figure 3:
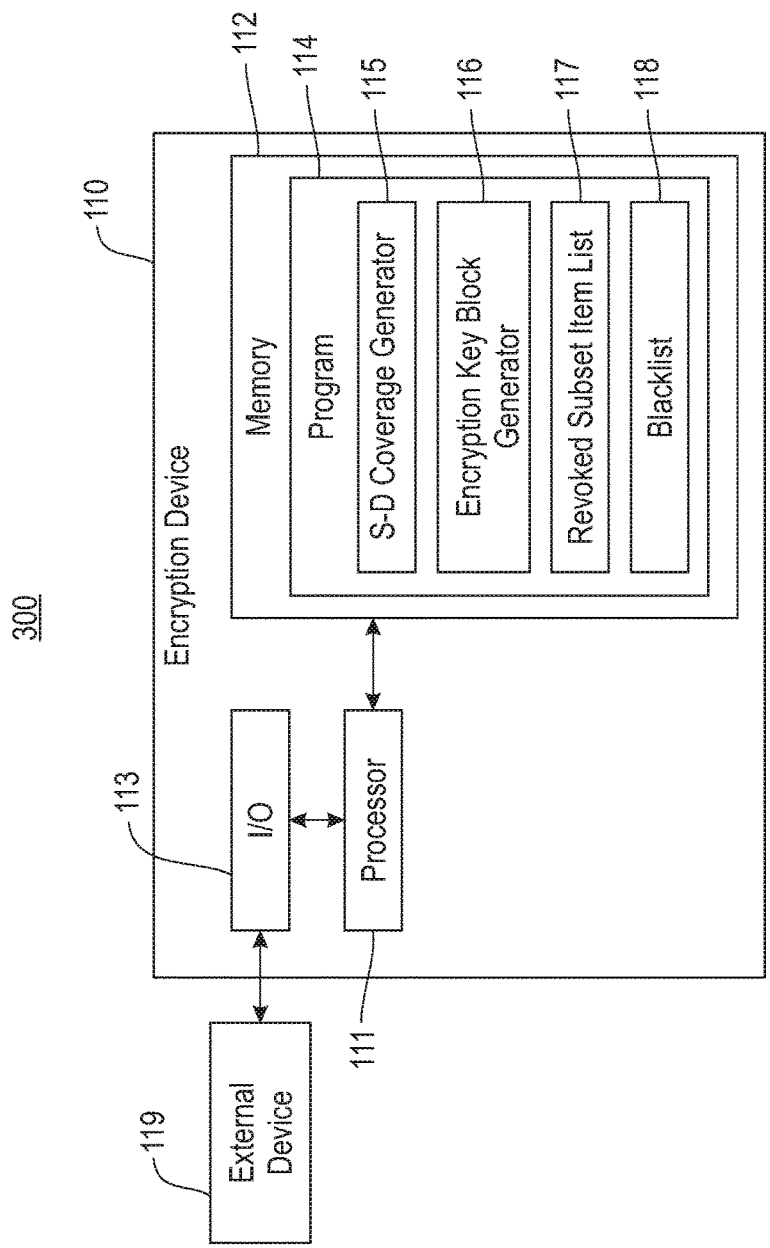
FIG. 3 illustrates an encryption device according to an embodiment of the present disclosure.

FIG. 3 illustrates the encryption device 110 according to one embodiment. As discussed above, the encryption device 110 may correspond to the MKB generator 230 of FIG. 2. The encryption device 110 includes a processor 111 and memory 112. The memory 112 may store an S-D coverage generator program 115, an encryption key block generator program 116, a list of revoked subset items 117 and a blacklist 118. The encryption device 110 also includes an I/O module 113 for communicating with one or more external devices 119 via a wired connection, wireless connection or data storage device, such as storage disks or memory. The descriptor generator 210 of FIG. 2 is one example of an external device 119. Although a few components, programs and functional units have been described for purposes of illustration as being most relevant to the present disclosure, embodiments of the present disclosure encompass any number of additional or equivalent components, programs and functional units.

In addition, embodiments of the present disclosure encompass multiple devices performing different functions illustrated in FIG. 3. For example, the external device 119 may be a computer for generating instructions to the encryption device 110 for generating an S-D coverage tree. The external device 119 may store and update the list of revoked subset items 117 and blacklist 118, and may provide the lists to the encryption device 110 during an operation for generating an encryption key block.

The encryption device 110 generates an S-D coverage tree with the S-D coverage generator 115. The S-D coverage tree is a list of subset items corresponding to covered media devices associated with an encryption system. The S-D coverage tree also identifies revoked subset items, which are omitted from coverage. The S-D coverage generator 115, or the processor 111 executing the S-D coverage generator, further analyzes each subset item of the S-D coverage tree, and if the subset item corresponds to a subset item located on the blacklist 118, the S-D coverage generator 115 performs a method to isolate blacklisted subset items.

For example, in one embodiment, the S-D coverage generator 115 divides the subset item into two or more subset items and analyzes each of the two or more subset items to determine if the subset item is blacklisted. If the subset item cannot be divided, such as if the subset item is a base node of a coverage tree corresponding to a media device, the encryption device 110 may perform a predetermined action to address the blacklisted node. For example, in one embodiment the S-D coverage generator revokes the blacklisted subset item. In another embodiment, the S-D coverage generator generates a message suggesting revocation of the subset item. In yet another embodiment, the S-D coverage generator halts the S-D coverage tree generation process and generates a message indicating a blacklisted base subset item has been encountered.

Upon completion of the modification of the S-D coverage tree by the S-D coverage generator 115, the encryption key block generator 116 may generate one or more encryption keys based on the final S-D coverage tree. The encryption keys may be provided to data storage media (such as the transmission media 120 of FIG. 1) to encrypt content in the data storage media.

In embodiments of the present disclosure, the blacklist 118 contains a list corresponding to one or more target devices, such as devices that are compromised. The blacklist may also contain S-D values, S-D lists corresponding to a series of nodes, subset values or node values. In other words, the blacklist 118 may contain any value or identifier for identifying nodes, subsets, subset-differences or target devices.

FIGS. 4-9 illustrate portions of coverage trees according to some embodiments of the invention. These portions are provided by way of example, and embodiments of the invention encompass any type and size of coverage tree. In FIGS. 4-9, subsets are identified by a node at the apex of the subset, subset-differences are identified by a node at an apex of a parent subset and a node at an apex of a child subset, where the child subset is excluded from coverage. Thus, a given subset may be described as rooted at its apex node. In FIGS. 4-9, covered subset items are identified by dashed circles and revoked subset items are identified by dashed squares. In embodiments in which a subset is covered by one subset item and omitted from another, the subset may be marked by both a circle and a square.

Figure 4:
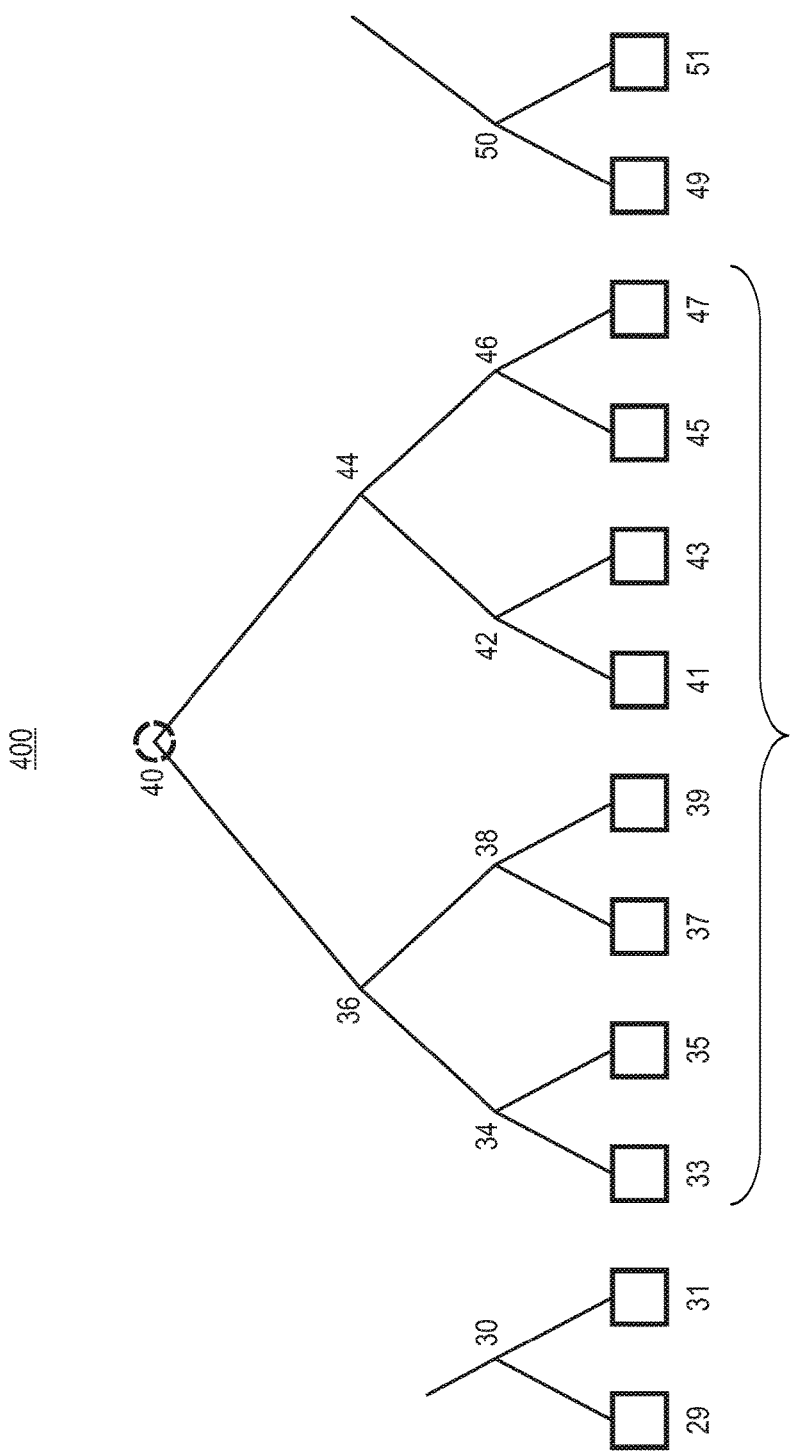
FIG. 4 illustrates a coverage tree according to an embodiment of the present disclosure.

FIG. 4 illustrates a coverage tree according to one embodiment. In FIG. 4, all of the nodes 33, 35, 37, 39, 41, 43, 45 and 47 can be covered by various subset differences based on node 40 (e.g., 40-33, 40 being the u-node in the {u,v} pair). Properties of the subset include subset node number $S_n$: 40, subset height $S_h$: 3 (where the height corresponds to the number of hierarchal levels above the base level), and leaf nodes covered, $S_c$: 8 (although in the exemplary cover discussed above, 40-33, the subset coverage would be 7).

Figure 5:
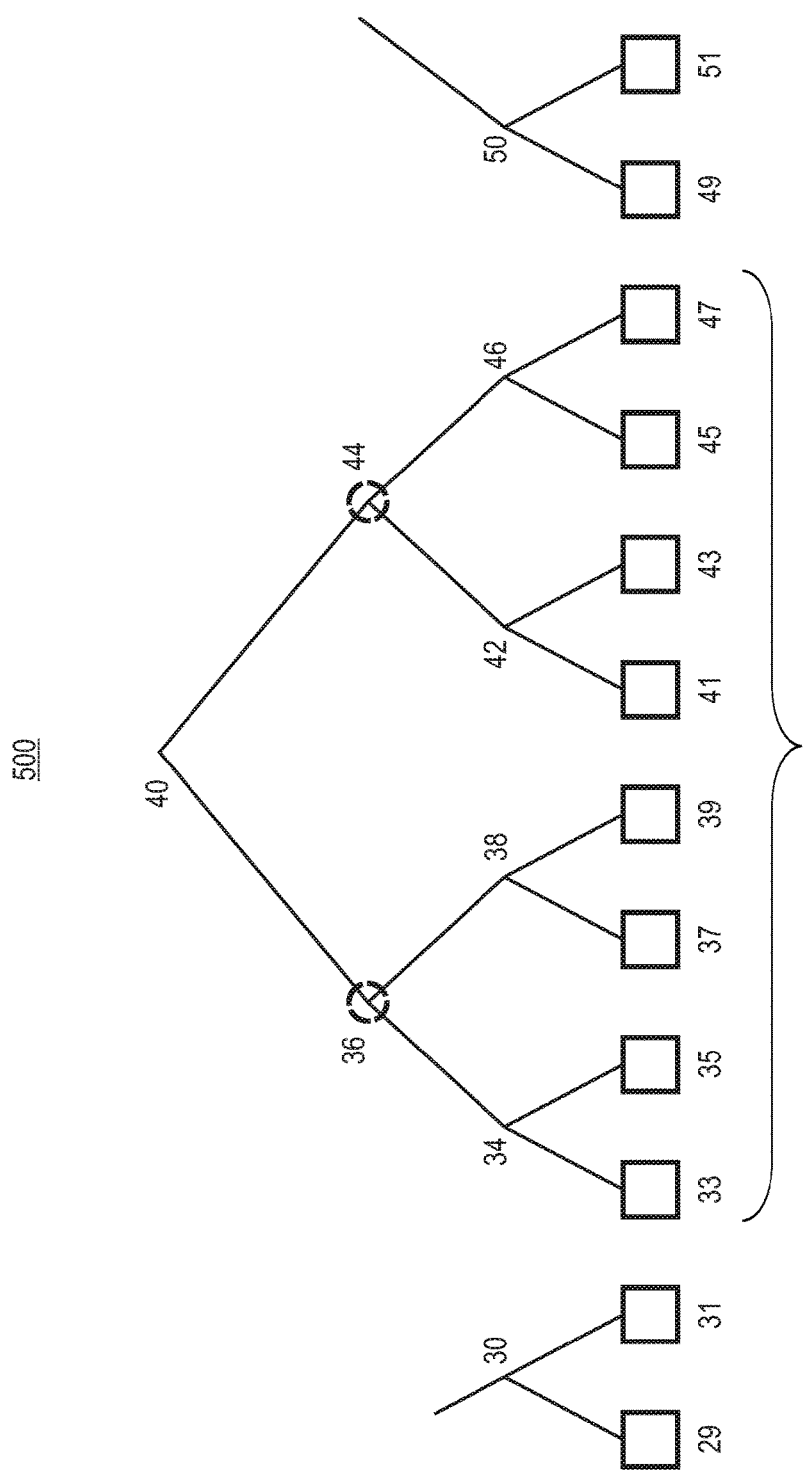
FIG. 5 illustrates a coverage tree according to an embodiment of the present disclosure.

FIG. 5 illustrates a coverage tree that can cover the same nodes 35, 37, 39, 41, 43, 45 and 47 according to a different coverage strategy. As illustrated in FIG. 5, the nodes 35, 37, 39, 41, 43, 45 and 47 can all be covered with two separate subsets spanning 36 and 44 (for example, 36-33 and 40-36). Properties of the subset include $S_n$: 36, 44, $S_h$: 2, and $S_c$: 7.

Figure 6:
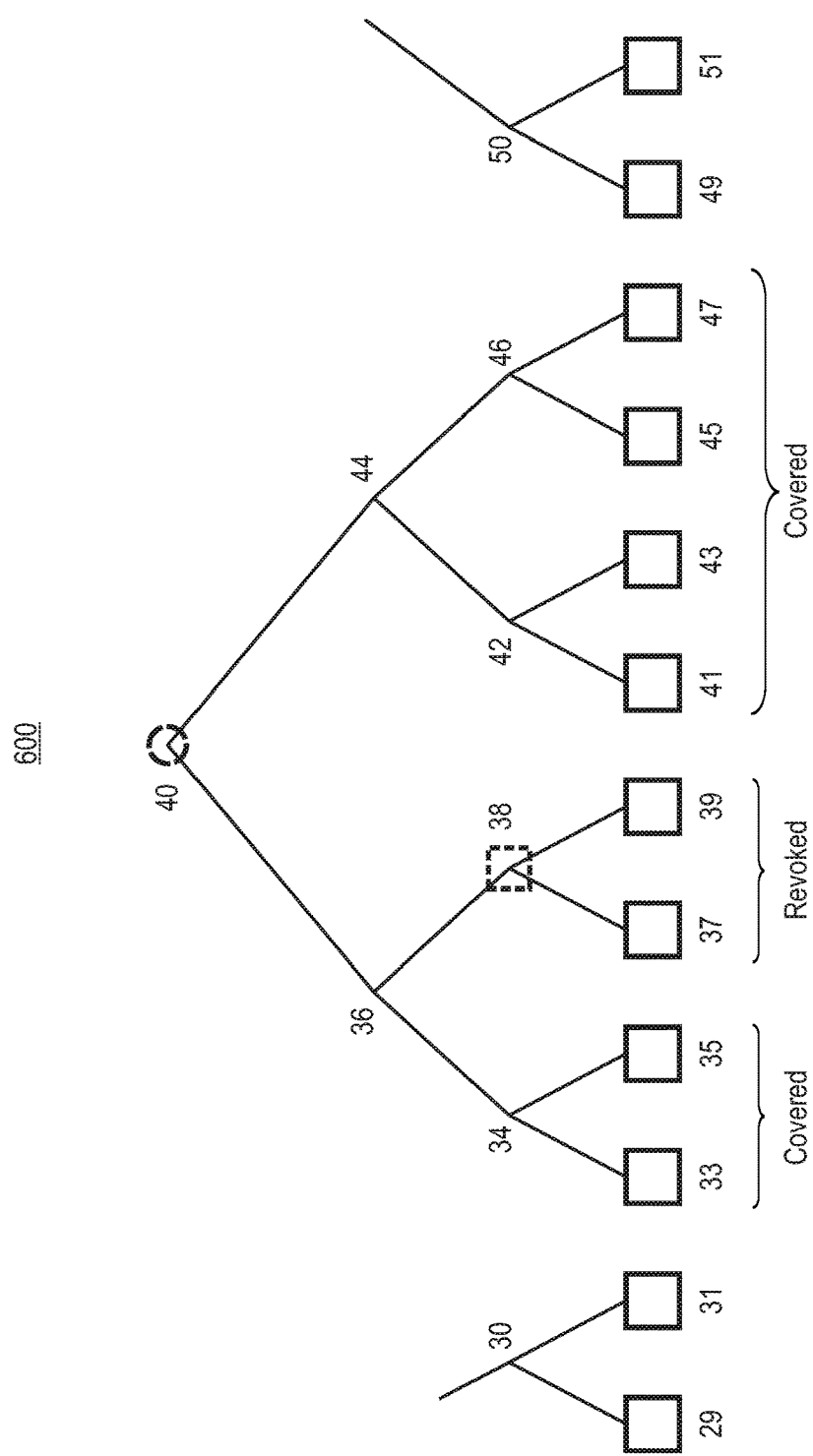
FIG. 6 illustrates an S-D tree according to an embodiment of the present disclosure.

FIG. 6 illustrates a subset-difference (S-D) coverage tree having two nodes, 37 and 39, revoked from coverage according to one embodiment. In this example, substitute coverage can be determined according to the present disclosure, yielding subsets 40-36 and 34-33, which cover the non-revoked nodes in this example.

Figure 7:
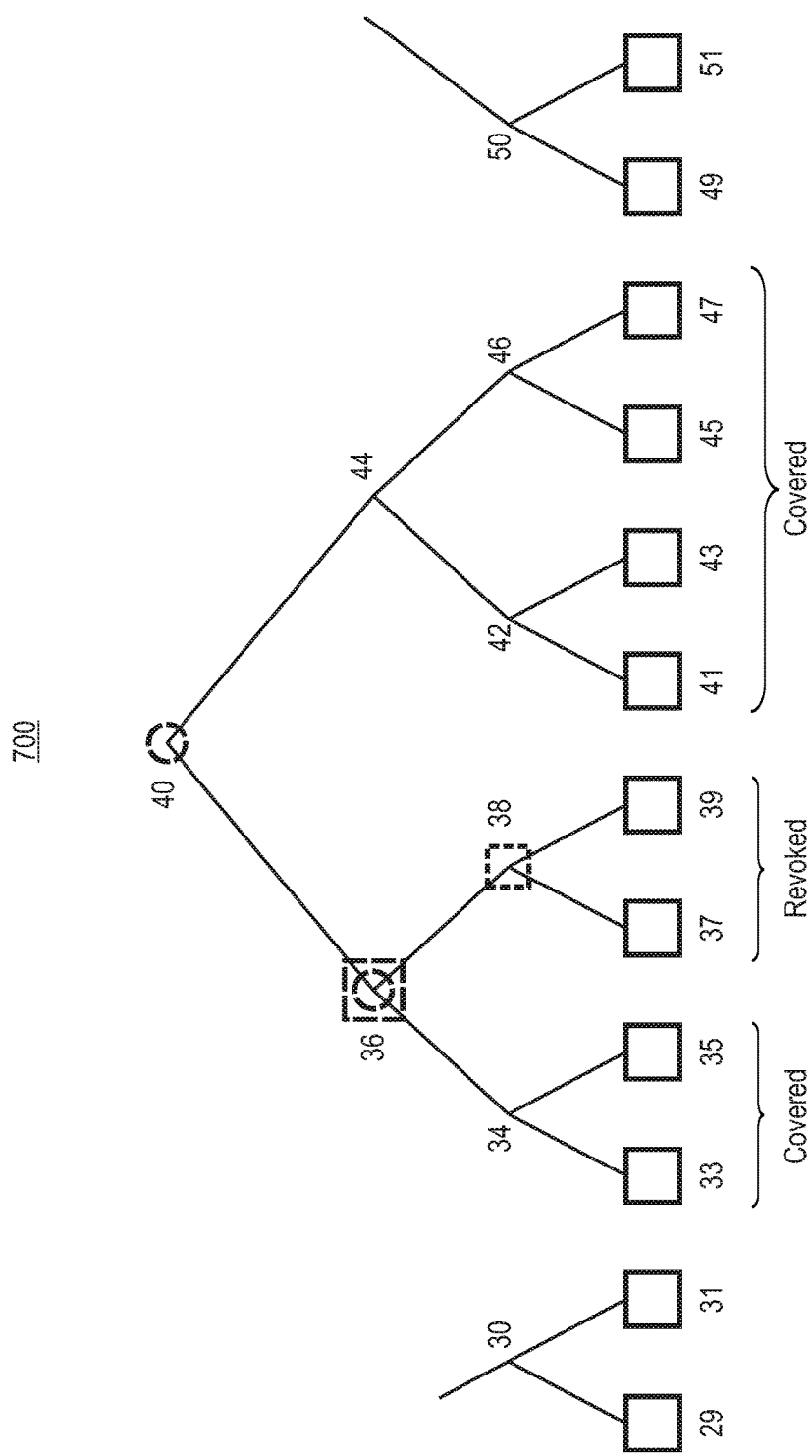
FIG. 7 illustrates an S-D tree according to an embodiment of the present disclosure.

FIG. 7 illustrates an S-D coverage tree according to another coverage strategy. In this example, the coverage includes nodes 35 and 41, 43, 45, and 47.

Figure 8:
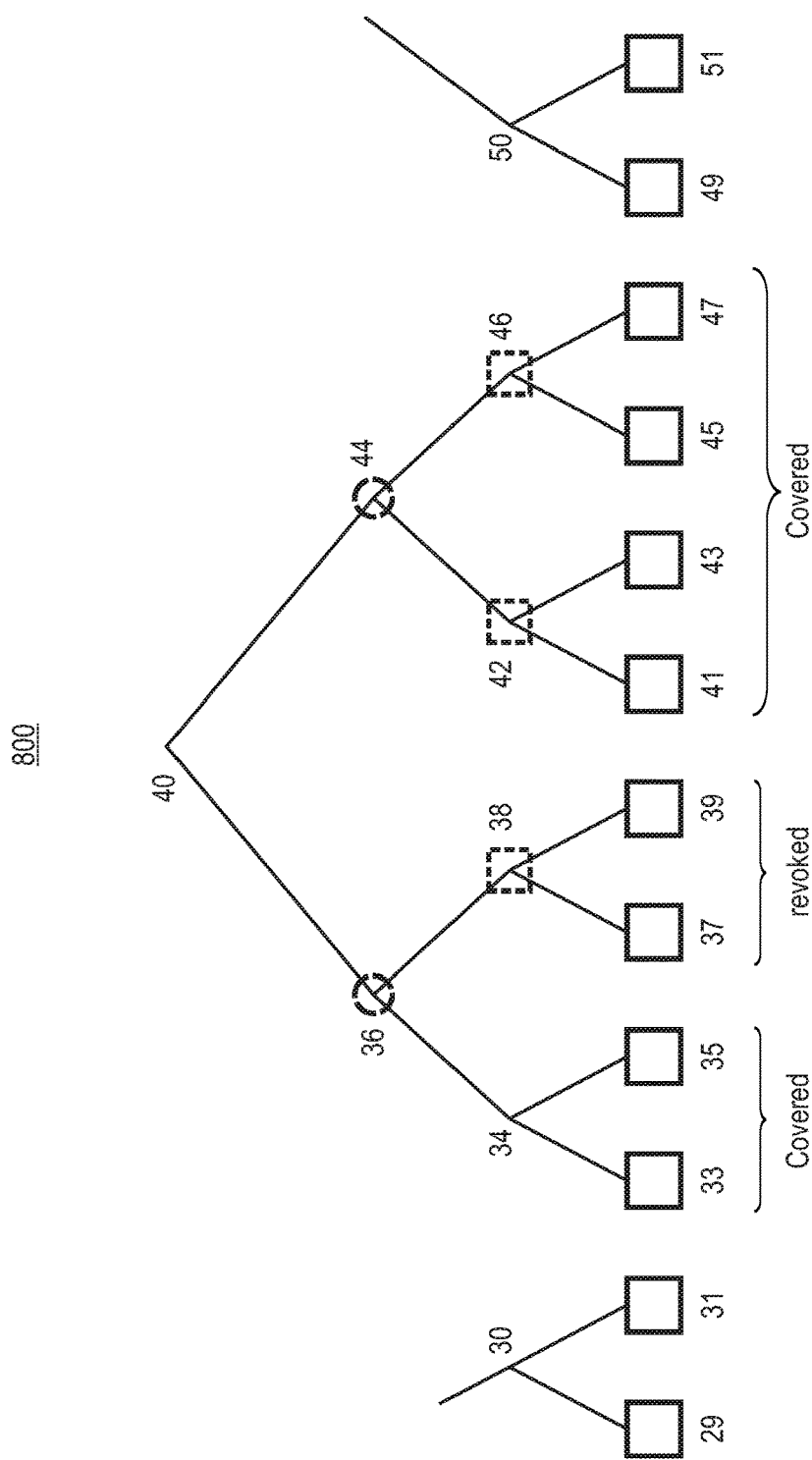
FIG. 8 illustrates an S-D tree according to an embodiment of the present disclosure.

FIG. 8 illustrates an S-D coverage tree according to another coverage strategy. In this example, the coverage includes subsets 34-33, 44-42, 44-46, spanning the same nodes as noted with respect to FIG. 7. In this way, an alternative substitute is provided.

While some examples of coverage strategies have been provided with reference to FIGS. 4-8, embodiments of the present disclosure encompass any coverage strategies.

In some embodiments, all possible {u,v} pairs covering a revoked node are blacklisted. It will be appreciated from the above description, that a given node is covered by a plurality of subset-differences in a subset difference tree. Referring to the exemplary trees of FIGS. 4-8, subset differences 38-39, 36-34, 36-33, 36-35, 40-34, 40-33, 40-35, 40-39, 40-44, 40-42, 40-46, 40-41, 40-43 and 40-47 each cover revoked node 37 and are in turn blacklisted.

Figure 9:
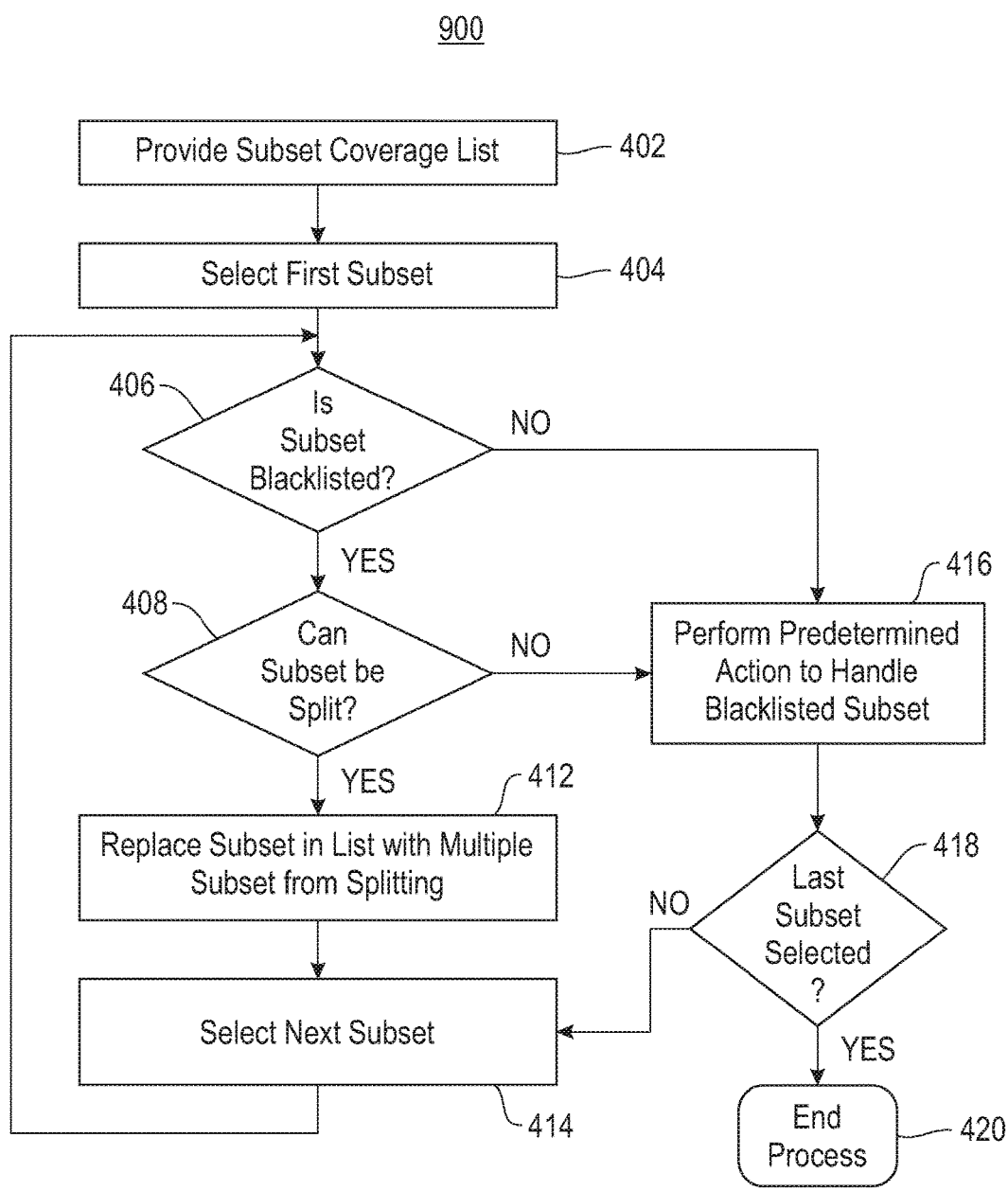
FIG. 9 illustrates a flow diagram of a method according to an embodiment of the present disclosure.

FIG. 9 illustrates a method according to one embodiment of the present disclosure. In block 402, a subset-difference (S-D) coverage list is generated or provided. The S-D coverage list may correspond to an S-D coverage tree and may be formed based on any coverage strategy. In one embodiment, the S-D coverage list is formed using an "optimal" coverage strategy, or a coverage strategy in which the largest-possible subset-differences are generated. In another embodiment, the S-D coverage list may be formed using a non-"optimal" coverage strategy. For example, the strategy may place restrictions on a height of a subset item in a corresponding coverage tree, or the strategy may include minimum or maximum numbers of subset items.

In block 404, a first subset item of the S-D coverage list is selected. In one embodiment, the subset item having the lowest subset number or node number is selected, indicating a subset at a highest hierarchal point in the coverage tree. In another embodiment, a subset having a highest subset number is selected. Embodiments of the disclosure encompass the selection of subset items based on any predetermined criteria.

In block 406, it is determined whether the selected subset item is blacklisted. For example, it may be determined whether the selected subset item corresponds to a subset item on the blacklist or is derived from a subset item on the blacklist. In one embodiment, the blacklist comprises a list of subsets, subset-differences or nodes and the selected subset item is one of a subset, subset-difference or node that is compared with the corresponding subsets, subset-differences or nodes of the blacklist.

If it is determined that the selected subset item is blacklisted, then it may be determined in block 408 whether the subset item may be split. If so, then in block 412 the selected subset item is replaced by a predetermined number of multiple subset items. In one embodiment, the number of multiple subset items into which the selected subset item is split is two subsets of equal size. In other embodiments, the subset items may be more than two, such as three, four, eight, or sixteen subset items.

On the other hand, if it is determined in block 408 that the subset item cannot be split, then a predetermined action may be taken in block 416 to isolate the compromised device. In one embodiment, the predetermined action includes automatically revoking the blacklisted subset item. In another embodiment, the predetermined action includes omitting the subset item from the blacklist. In another embodiment, the predetermined action includes providing a notice to a user, such as by generating a warning suggesting to a user or system that a device, node, subset-difference or subset be revoked. In another embodiment, the S-D coverage tree generation process may be halted and an error message may be generated, such as suggesting that the subset item be revoked.

In block 418, it is determined whether the last subset item of the S-D coverage tree has been selected. If so, the process may be ended in block 420. If additional subset items remain, another subset item (or, "the next subset item") is selected in block 414, and the process is repeated.

An example of splitting a selected subset item will be described with respect to FIGS. 6, 8 and 9. In one embodiment, the subset-difference 40,38 of FIG. 6 is a selected subset item, and one of the subset-difference 40,38, the subset 38 and the node 38 is blacklisted. Upon determining that the selected subset-difference 40,38 corresponds to a blacklisted subset item, the subset-difference 40-38 may be divided into multiple subset-differences 35,38; 44,42; and 44,46 as illustrated in FIG. 8. Upon determining that the subset-difference 36,38 also corresponds to a blacklisted subset item, the subset-difference 36,38 may be further divided into subset-differences 34,33 and 34,35, and a predetermined action may be taken with respect to one or more of the subset items 40,38; 36,38; 38,37; and 38,39. Examples of predetermined actions, as discussed above, include revoking subset items, generating an error, halting a blacklist analysis process, omitting subset items from a blacklist, or performing any other predetermined action.

In embodiments of the present disclosure, once a subset item is revoked, some or all of the corresponding subset items may be removed from the blacklist. The keys corresponding to these subset items may be used to flush out other attackers (or compromised devices). In one embodiment, removing the subset items, and corresponding keys, from the blacklist may be used to improve efficiency of the method and system by requiring fewer constraints to compare and match.

In one embodiment, instead of matching a subset item and the subset items derived from it with nodes on the blacklist, only the initial subset item may be matched with nodes listed on the blacklist. In another embodiment, the selected subset item itself is not matched with a node listed on the blacklist, but rather only subset items derived from the selected subset item are matched with the nodes listed on the blacklist. In another embodiment, only the selected subset item and subset items within a predetermined number of hierarchal levels of the selected subset item are compared with nodes listed on the blacklist. In other embodiments, only subset items along predetermined paths from the node defining the selected subset item are compared to the subset items listed on the blacklist. In other words, embodiments of the present disclosure encompass any scheme for comparing one or more subset items on a blacklist and acting to isolate a blacklisted subset item or perform other actions with respect to the blacklisted subset item.

In some embodiments, a subset item may be compared to blacklisted subset items having been subjected to a matching filter. Some examples of matching filters include only comparing blacklisted subset items over a predetermined range of values (e.g., a range of subset values S, a range of difference values D, a range of covered nodes, etc.), only comparing blacklisted subset items over a range of heights (e.g., a height from a base of a coverage tree), and only comparing blacklisted subset items over a range of depths (e.g., depths from a particular blacklisted subset item, depth from a parent node, depth from a child node, etc.).

Figure 10:
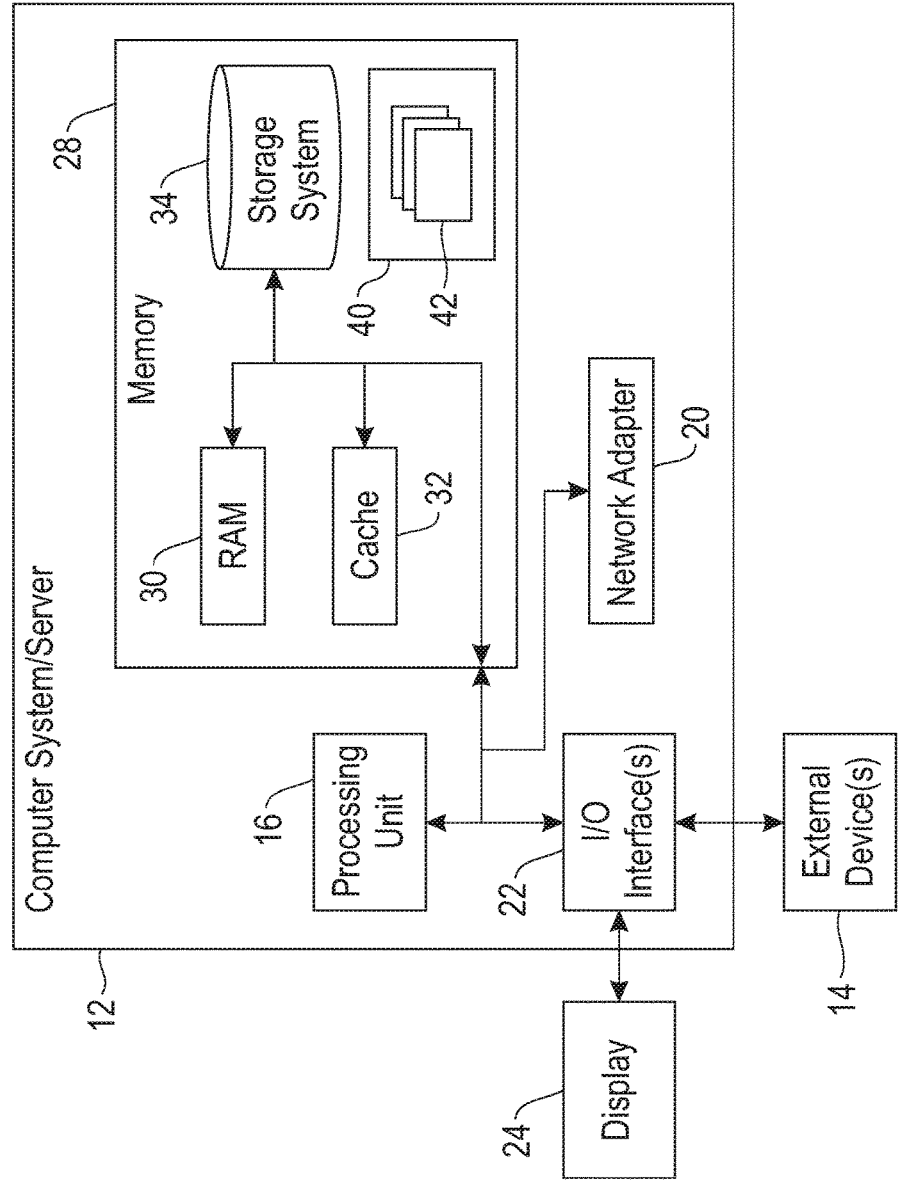
FIG. 10 depicts a computing node according to an embodiment of the present invention.

Referring now to FIG. 10, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for encrypting content, the method comprising:
    generating a subset-difference tree comprising a plurality of subsets, the subset-difference tree covering a plurality of nodes and each of the plurality of subsets having an apex node among the plurality of nodes, each node corresponding to an encryption key;
    determining at least one blacklisted node among the plurality of nodes;
    identifying a first subset among the plurality of subsets that covers the at least one blacklisted node;
    determining a plurality of substitute subsets by splitting the first subset, each of the plurality of substitute subsets overlapping the first subset and not covering the at least one blacklisted node;
    substituting the plurality of substitute subsets for the first subset in the subset-difference tree;
    generating a key block corresponding to the subset-difference tree; and
    encrypting content for broadcast distribution, the encrypted content being decryptable using an encryption key corresponding to a node in the subset-difference tree, in combination with the key block.

2. The method of claim 1, wherein determining at least one blacklisted node comprises reading a blacklist.

3. The method of claim 1, wherein each of the plurality of substitute subsets has an apex node descending from the apex node of the first subset within the subset-difference tree.

4. The method of claim 3, wherein each of the plurality of substitute subsets has an apex node within a predetermined level distance of the apex node of the first subset within the subset-difference tree.

5. The method of claim 1, wherein the at least one blacklisted node is leaf node.

6. The method of claim 1, wherein the at least one blacklisted node is a non-leaf node.

7. The method of claim 1, wherein the at least one blacklisted node comprises at least one subset difference associated with a non-leaf node.

8. The method of claim 1, comprising:
    generating at least one encryption key based on the subset-difference tree.

9. A computer program product for encrypting content, the computer program product comprising a computer readable storage medium having program instructions embodied therewith, the program instructions executable by a processor to cause the processor to perform a method comprising:
    generating a subset-difference tree comprising a plurality of subsets, the subset-difference tree covering a plurality of nodes and each of the plurality of subsets having an apex node among the plurality of nodes, each node corresponding to an encryption key;
    determining at least one blacklisted node among the plurality of nodes;
    identifying a first subset among the plurality of subsets that covers the at least one blacklisted node;
    determining a plurality of substitute subsets, each of the plurality of substitute subsets overlapping the first subset and not covering the at least one blacklisted node;
    substituting the plurality of substitute subsets for the first subset in the subset-difference tree;
    generating a key block corresponding to the subset-difference tree; and
    encrypting content for broadcast distribution, the encrypted content being decryptable using an encryption key corresponding to a node in the subset-difference tree, in combination with the key block.

10. The computer program product of claim 9, wherein determining at least one blacklisted node comprises reading a blacklist.

11. The computer program product of claim 9, wherein each of the plurality of substitute subsets has an apex node descending from the apex node of the first subset within the subset-difference tree.

12. The computer program product of claim 11, wherein each of the plurality of substitute subsets has an apex node within a predetermined level distance of the apex node of the first subset within the subset-difference tree.

13. The computer program product of claim 9, wherein the at least one blacklisted node is leaf node.

14. The computer program product of claim 9, wherein the at least one blacklisted node comprises at least one subset difference associated with a non-leaf node.

15. The computer program product of claim 9, the method comprising:
    generating at least one encryption key based on the subset-difference tree.

* * * * *